US009357273B2

(12) United States Patent
De Vleeschauwer et al.

(10) Patent No.: US 9,357,273 B2
(45) Date of Patent: May 31, 2016

(54) METHOD AND CLIENT APPARATUS FOR RECEIVING AN HTTP ADAPTIVE STREAMING VIDEO

(71) Applicant: Alcatel Lucent, Boulogne Billancourt (FR)

(72) Inventors: Danny De Vleeschauwer, Evergem (BE); Johan De Vriendt, Afsnee (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/648,441

(22) PCT Filed: Nov. 25, 2013

(86) PCT No.: PCT/EP2013/074530
§ 371 (c)(1),
(2) Date: May 29, 2015

(87) PCT Pub. No.: WO2014/082942
PCT Pub. Date: Jun. 5, 2014

(65) Prior Publication Data
US 2015/0304734 A1 Oct. 22, 2015

(30) Foreign Application Priority Data

Nov. 30, 2012 (EP) .................................... 12306495

(51) Int. Cl.
*H04N 7/173* (2011.01)
*H04N 21/6373* (2011.01)
(Continued)

(52) U.S. Cl.
CPC ........ *H04N 21/6373* (2013.01); *H04L 65/4092* (2013.01); *H04L 65/80* (2013.01);
(Continued)

(58) Field of Classification Search
CPC ............ H04N 21/6373; H04N 21/238; H04N 21/2393; H04N 21/2662; H04N 21/437; H04N 21/438; H04N 21/44008; H04N 21/44209; H04N 21/6377; H04N 21/64322; H04L 65/4092; H04L 65/80
See application file for complete search history.

(56) References Cited

U.S. PATENT DOCUMENTS 7,206,855 B1 * 4/2007 Hamilton ............... G06Q 10/10
  370/232
2008/0114889 A1 * 5/2008 Deshpande ........ H04N 21/2343
  709/231

(Continued)

FOREIGN PATENT DOCUMENTS

EP       2 360 923 A1   8/2011
WO   WO 2011/047335 A1   4/2011

OTHER PUBLICATIONS

Manish Jain et al., "End-to-end Estimation of the Available Bandwidth Variation Range," Performance Evaluation Review, vol. 33, No. 1, pp. 265-276, XP002694601, Jun. 2005.

(Continued)

*Primary Examiner* — Oleg Asanbayev
(74) *Attorney, Agent, or Firm* — Fay Sharpe LLP (57) ABSTRACT

A method for receiving an HTTP adaptive streaming video from a server, said method comprising at a client, operatively connected to said server upon receiving a chunk of said video, determining a current rate of transmission for transmissions from said server to said client; obtaining statistical information pertaining to an expected future rate of transmission, in function of at least said current rate of transmission; deriving a target rate of transmission from said statistical information; and requesting a subsequent chunk of said video in accordance with said target rate of transmission.

7 Claims, 5 Drawing Sheets

(51) Int. Cl.
    *H04L 29/06*     (2006.01)
    *H04N 21/238*     (2011.01)
    *H04N 21/239*     (2011.01)
    *H04N 21/2662*     (2011.01)
    *H04N 21/437*     (2011.01)
    *H04N 21/438*     (2011.01)
    *H04N 21/44*     (2011.01)
    *H04N 21/442*     (2011.01)
    *H04N 21/6377*     (2011.01)
    *H04N 21/643*     (2011.01)

(52) U.S. Cl.
    CPC ........ *H04N 21/238* (2013.01); *H04N 21/2393* (2013.01); *H04N 21/2662* (2013.01); *H04N 21/437* (2013.01); *H04N 21/438* (2013.01); *H04N 21/44008* (2013.01); *H04N 21/44209* (2013.01); *H04N 21/6377* (2013.01); *H04N 21/64322* (2013.01)

(56) References Cited

U.S. PATENT DOCUMENTS

2011/0082924 A1     4/2011   Gopalakrishnan
2013/0243082 A1*   9/2013   Bocus .............. H04N 19/00006
                                                                  375/240.02

OTHER PUBLICATIONS

Dong Lu et al., "Characterizing and Predicting TCP Throughput on the Wide Area Network," 25$^{th}$ IEEE International Conference on Distributed Computing Systems, pp. 414-424, XP002694602, 2005.
International Search Report for PCT/EP2013/074530 dated Jan. 8, 2014.

\* cited by examiner

METHOD AND CLIENT APPARATUS FOR RECEIVING AN HTTP ADAPTIVE STREAMING VIDEO

FIELD OF THE INVENTION

The present invention relates to the field of HTTP Adaptive Streaming (HAS), and in particular to the issue of determining the nominal bit rate of chunks to be requested.

BACKGROUND

An important technique to deliver video over the open Internet is HAS (HTTP (Hyper Text Transport Protocol) Adaptive Streaming). This technique has the advantage that it is easily deployable, because it traverses firewalls more easily than other protocols, because it has inherent congestion control which it inherits from TCP (Transport Control Protocol), and because it can make use of the existing HTTP infrastructure, in particular HTTP caches and CDN (Content Distribution Network) nodes.

According to the design principle of HAS, video is encoded at different bit rates and the client can switch between these bit rates at specified moments in time. Often the interval of video between two consecutive switching times is referred to as a video segment, while the bit strings associated with that interval are referred to as chunks (i.e., there are as many different chunks available as there are bit rate versions).

Today, there are no fully satisfactory mechanisms to select the most appropriate chunk relative to network performance.

SUMMARY

It is an object of the present invention to provide a more satisfactory method and client for receiving an HAS video stream.

According to an aspect of the invention, there is provided a method for receiving an HTTP adaptive streaming video from a server, the method comprising at a client, operatively connected to the server: upon receiving a chunk of the video, determining a current rate of transmission for transmission from the server to the client; obtaining statistical information pertaining to an expected future rate of transmission, in function of at least the current rate of transmission; deriving a target rate of transmission from the statistical information; and requesting a subsequent chunk of the program in accordance with the target rate of transmission.

It is an advantage of the method according to the present invention that it anticipates network performance in terms of transmission rate on the basis of a current (and optionally also recent) transmission rate observation and the expected future transmission rate that is statistically linked to it. This is particularly relevant when the client is capable of operating over different types of networks at different moments in time. In particular, the network between the client and the server may include a wireless link (e.g., an IEEE 802.11 WLAN link, a mobile link such as UMTS, 3G, LTE, ... ) and/or a wired link (e.g. an IEEE 802.3 "Ethernet" link, a PLC link, an xDSL link, a coax link, etc.). By taking into account statistics that relate (expected) future network behavior to the observed behavior, a more optimal requesting strategy can be deployed for the network topology that is actually present. Thus, the invention can be implemented with an easy to assess metric, viz. the transmission rate on the network link from the server to the client.

In an embodiment of the method according to the present invention, the statistical information comprises a histogram, and the deriving comprises calculating a predetermined quantile from the histogram.

It is an advantage of this embodiment that the method not only provides an appropriate extrapolation of current (and optionally past) network performance to the future, but it also implies a certain level of confidence that the future network performance is not being overestimated. The latter point is importance because an overestimation of network performance, and the associated request of a chunk that is too large to be delivered in a timely manner in view of the actual future network performance, may lead to a buffer underrun and unacceptable deterioration in the quality of experience for the end user of the HAS stream (possibly even "freezing" or complete disappearance) of the video images).

Various quantiles may be selected, according to the requirements of the operator and/or the user. Preferably, the quantile is selected to cover at least the 50% best cases (at this point, the selected quantile is the median), or the 75% best cases (i.e., the quantile is the 25-percentile), or even the 95% best cases (i.e., the quantile is the 95-percentile), or any appropriate quantile thereinbetween.

In a particular embodiment, the quantile is one of a 5-percentile, a 1-percentile, and a 0.1-percentile.

It is an advantage of these embodiments that they can be used to provide extremely high levels of assurance that the streamed content will be able to be consumed without interruptions due to network performance problems.

In an embodiment, the method according to the present invention further comprises updating the statistical information with the determined current rate of transmission.

It is an advantage of this embodiment that the system is self-learning, in the sense that observed patterns of network performance are cumulatively stored as statistical information, to improve subsequent determinations of target rates. Preferably, not only information of the current session is used, but the knowledge is built up (and optionally aged) over several or all sessions of a client.

In a particular embodiment, the statistical information is obtained from and updated at a network node that is separate from the client, the network node being configured to store statistical information from a plurality of clients.

It is an advantage of this embodiment that more accurate statistics are collected, thanks to the contribution of a larger number of clients, and hence better performance is achieved for all the clients involved.

In a more particular embodiment, the rate of transmission information is stored at the network node in association with auxiliary information, such as an associated network type, a time of day, or a day of week.

It is an advantage of this embodiment that the statistical information can be applied more accurately, by using only that information which is most relevant to the actual situation of the client that is being served.

In an embodiment of the method according to the present invention, the obtaining of the statistical information takes place upon starting up the client.

In this embodiment, it is part of the boot or initialization sequence of the client device to obtain the most recent relevant statistics from the statistics database (which may be stored on a component internal to the client, or on a separate network node which optionally aggregates statistics from various clients).

In an embodiment of the method according to the present invention, the obtaining of the statistical information takes place at intervals.

In this embodiment, the statistical information is provided to the client at certain time intervals. These intervals may be fixed, variable over time in a predetermined manner, or even depending on certain observed or anticipated changes in network conditions. The transmission of statistical information may happen at the initiative of the client (i.e., the client pulls the relevant information from the database, for instance by polling the server hosting the database), or at the initiative of a server (i.e., the server pushes the updates of the statistical information to one or more clients). In situations where there may be a large time lapse between the moment at which a client device is initially started up and the moment at which it starts consuming HAS traffic, which may for example be the case for mobile devices, this embodiment avoids the use of outdated statistics in the calculation of the required quality level for HAS chunks to be requested.

According to an aspect of the invention, there is provided a computer program product comprising code means configured to execute the method as described above.

According to an aspect of the invention, there is provided an apparatus for receiving an HTTP adaptive streaming video from a server, the apparatus comprising: a network interface adapted to operatively connect the apparatus to the server; a database interface adapted to operatively connect the apparatus to a statistics database; and a processor, operatively connected to the network interface and the database interface, the processor being configured to: determine a current rate of transmission from the server to the apparatus; obtain statistical information pertaining to an expected future rate of transmission, from the statistics database, in function of the current rate of transmission; derive a target rate of transmission from the statistical information; and request a subsequent chunk of the program from the server in accordance with the target rate of transmission.

In an embodiment of the apparatus according to the present invention, the statistical information comprises a histogram, and wherein the deriving comprises calculating a predetermined quantile from the histogram.

In a particular embodiment, the quantile is one of a 5-percentile, a 1-percentile, and a 0.1-percentile.

In an embodiment of the apparatus according to the present invention, the processor is further configured to procure the determined current rate of transmission to the statistics database.

In an embodiment, the apparatus according to the present invention further comprises the statistics database, operatively connected to the database interface.

In this embodiment, the client apparatus does not have to interface with an external database entity to operate in accordance with the principles of the present invention.

According to an aspect of the invention, there is provided a set-top box comprising the apparatus as described above.

The technical effects and advantages of embodiments of the apparatus, the computer program product, and the set-top box according to the present invention correspond mutatis mutandis to those of the corresponding embodiments of the method according to the present invention.

BRIEF DESCRIPTION OF THE FIGURES

Some embodiments of apparatus and/or methods in accordance with embodiments of the present invention are now described, by way of example only, and with reference to the accompanying drawings, in which.

DESCRIPTION OF EMBODIMENTS

In order to select which chunk to download for each video interval, an HAS client monitors the available network throughput it sees, in particular the throughput offered by TCP, and tries to match the video bit rate (for the next chunk) to this available network throughput. Because the requested video bit rate cannot match the available network bit rate exactly, the client needs to maintain a play-out buffer.

Figure 1:
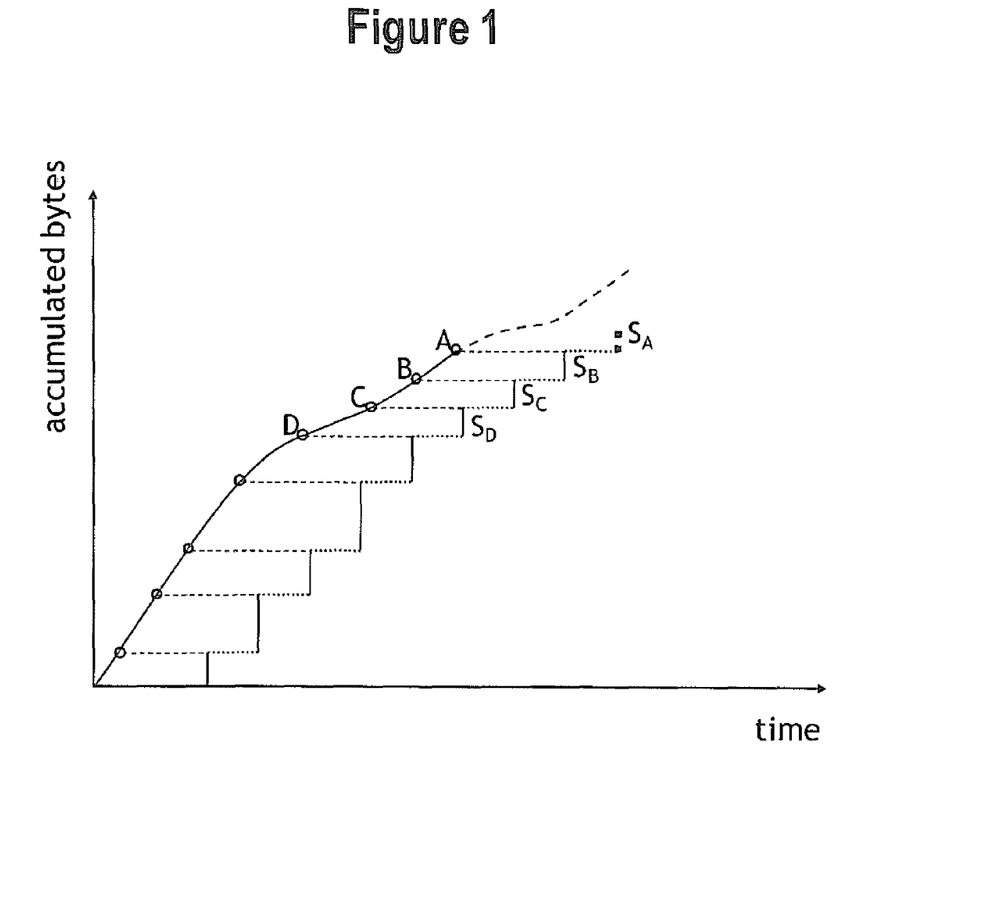
FIG. 1 illustrates the operation of the rate decision algorithm (RDA) of an HAS client.
Figure 2:
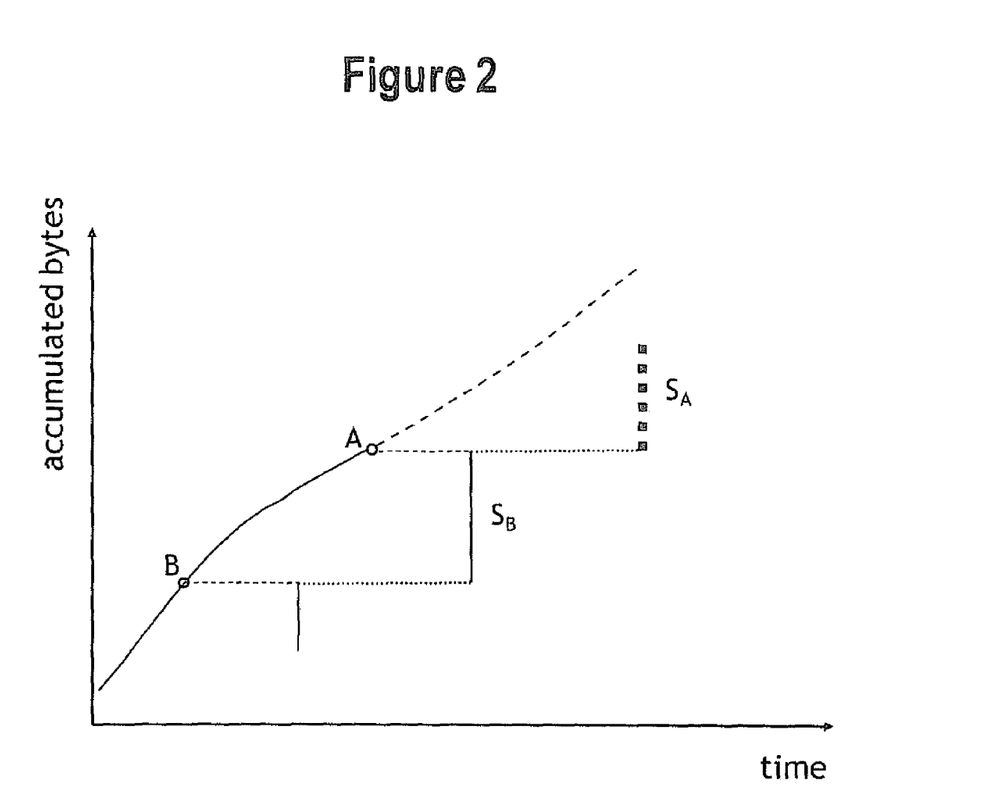
FIG. 2 further illustrates the operation of the rate decision algorithm (RDA) of an HAS client.

FIGS. 1 and 2 illustrate the rate decision algorithm (RDA) which governs the client's decisions. The client downloads the next chunk in such a version that the bytes needed by the decoder are already received some time before the moment at which the decoder needs them. With reference to FIGS. 1 and 2, this means that the stepwise content receiving curve (lower curve) should not intersect the transmission rate envelope (upper curve), where the latter indicates how fast the bytes are arriving to the client and the former indicates how quickly the decoder needs them. The illustrated content receiving curve exhibits sharp steps, which represents the fact that the decoder empties its data buffer by chunks; the consumption of a single chunk is represented by a vertical segment of the curve, while the time between the consumption of two consecutive chunks is represented by a horizontal segment of the curve.

The present invention concerns a method and an apparatus that use improved rate decision algorithms. The invention will now be further explained with reference to a rate decision algorithm that uses statistical information pertaining to network throughput (from server to client).

The knowledge associated with the evolution of the throughput, given a certain past behavior of the throughput, is captured in the conditional probability that the throughput $T_{[A,.]}$ immediately after decision point A takes a certain value $t_{[A,.]}$ given that the throughputs $T_{[B,A]}$, $T_{[C,B]}$, ... over the previous intervals assumed the values $t_{[B,A]}$, $t_{[C,B]}$, ... respectively:

$$Pr[T_{[A,.]}=t_{[A,.]}|T_{[B,A]}=t_{[B,A]}, T_{[C,B]}=t_{[C,B]}, \ldots] \quad \text{(Equation 1)}$$

Figure 3:
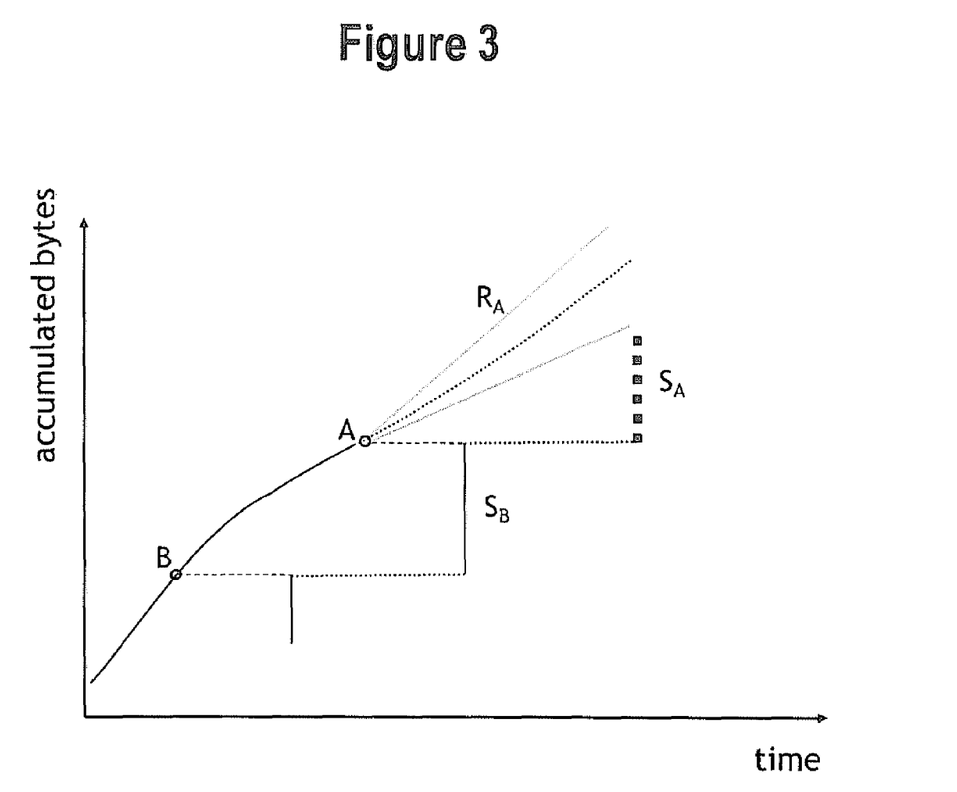
FIG. 3 illustrates an exemplary operation of the RDA in an embodiment of the present invention.

FIG. 3 illustrates this embodiment. At each decision point A, the current version of $Pr[T_{[A,.]}=t_{[A,.]}|T_{[B,A]}=t_{[B,A]}, T_{[C,B]}=t_{[C,B]}, \ldots]$ is used to determine the quality version in which the next chunk is to be downloaded. This strategy may readily be combined with known design principles of traditional decision algorithms.

Preferably, $Pr[T_{[A,.]}=t_{[A,.]}|T_{[B,A]}=t_{[B,A]}, T_{[C,B]}=t_{[C,B]}, \ldots]$ is updated after each (successful) decision and this information is maintained over all sessions of the client device in question. In this way, the RDA according to the invention can predict the throughput evolution better than traditional algorithms can, and hence, it can make better decisions.

Equation 1 provides statistical information about the transmission rate under the form of an estimated conditional probability density function. For practical computational reasons, the statistical information is preferably used in a discretized form, which will be referred to herein as "histogram information".

One possibility to maintain $Pr[T_{[A,\cdot]}=t_{[A,\cdot]}|T_{[B,A]}=t_{[B,A]}, T_{[C,B]}=t_{[C,B]}, \ldots]$ up to date is to proceed as follows.

The vector space of (K+1)-dimensional vectors is quantized in bins (covering the complete vector space, where the bins can be rectangular or have any other shape), where K is the number of past interval that are considered. Each bin maintains an estimate of $Pr[T_{[A,\cdot]}=t_{[A,\cdot]}|T_{[B,A]}=t_{[B,A]}, T_{[C,B]}=t_{[C,B]}, \ldots]$ (in fact, an integral thereof over the area the bin covers).

At decision point A, the probability value of each bin (where all probabilities sum to 1 before multiplication) is multiplied by α and after it is determined in which of the bins the observed vector $(t_{[A,\cdot]}, t_{[B,A]}, t_{[C,B]}, \ldots)$ falls (where $t_{[B,A]}, t_{[C,B]}, \ldots$ are the measured throughputs in K intervals prior to the decision point and $t_{[A,\cdot]}$ is the throughput in the interval after the decision point), the probability value of that particular bin is augmented by (1−α) (ensuring that the sum of all probabilities remains 1 after the updating process).

The conditional probabilities required in the RDA proposed in this invention is given by $$Pr[T_{[A,\cdot]}=t_{[A,\cdot]}|T_{[B,A]}=t_{[B,A]}, T_{[C,B]}=t_{[C,B]}, \ldots] = Pr[T_{[A,\cdot]}=t_{[A,\cdot]}, T_{[B,A]}=t_{[B,A]}, T_{[C,B]}=t_{[C,B]}, \ldots]/Pr[T_{[B,A]}=t_{[B,A]}, T_{[C,B]}=t_{[C,B]}, \ldots]$$ (Equation 2)

An alternative to maintain $Pr[T_{[A,\cdot]}=t_{[A,\cdot]}|T_{[B,A]}=t_{[B,A]}, T_{[C,B]}=t_{[C,B]}, \ldots]$ is to just count (over a sliding window) the number of events falling in each bin and count and divide by the total number of events (in the sliding window).

In a preferred variant of the invention, the knowledge associated with the evolution of the throughput given the past behavior of the throughput does not only depend on the past throughputs $T_k$, but also on one or more other parameters, such as, the network over which the video is downloaded (e.g., WiFi, 3G or LIE), the time of day (e.g., busy hour, non busy hour), the SINR (signal to interference and noise) value (in case of wireless) and the number of competing clients (if known), etc.

Figure 4:
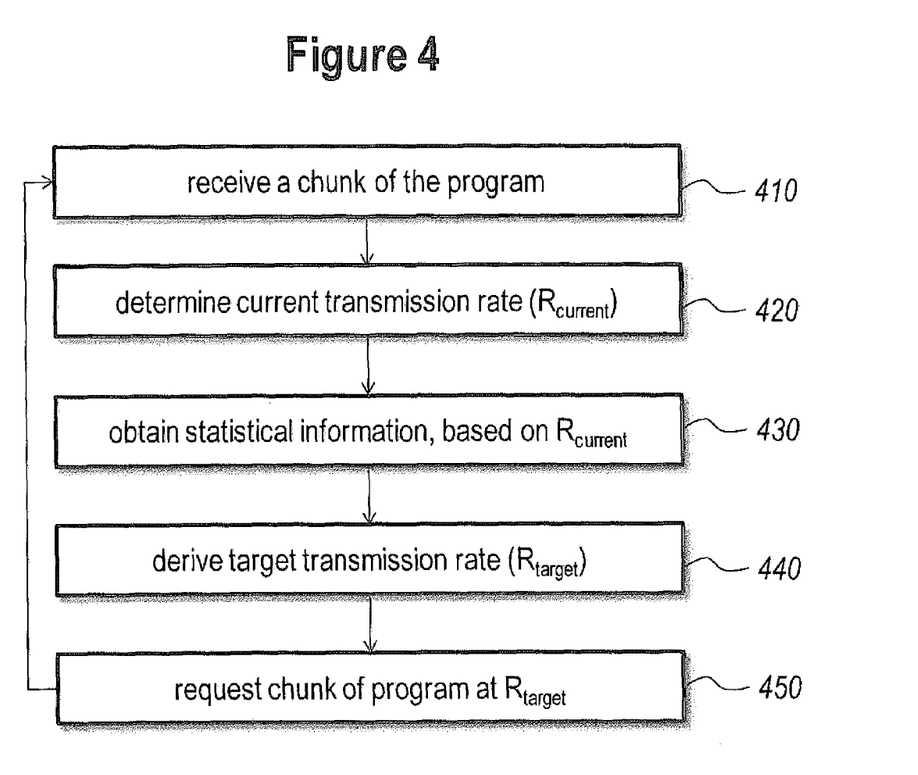
FIG. 4 provides a flow chart of an embodiment of the method according to the present invention.

FIG. 4 provides a flow chart of an embodiment of the method according to the present invention. The flow chart illustrates steps to be taken at the client side, the client being operatively connected to a server (for instance in the general layout illustrated in FIG. 5).

In a preliminary first step 410, the client receives a chunk of the video of interest (as a result of a previous request, not illustrated). Upon receiving this chunk, the client determines 420 a current transmission rate $R_{current}$ for transmission from the server to the client. Without loss of generality, FIG. 4 only refers to a determination of the current rate of transmission. It shall be obvious to the skilled reader that the invention works in a fully analogous way when the method relies on multiple transmission rate observations, i.e. for a set of the past K chunks. In this case, the client stores the relevant previous values for future use.

On the basis of at least the current level of network performance $R_{current}$ (and optionally over the last K received chunks), the client obtains 430 statistical information pertaining to an expected future level of network performance. The client may for example obtain the probability density function as described above, preferably parametrized in some appropriate form, or a discretized form of histogram information.

Finally, the client derives a target rate of transmission $R_{target}$ from the statistical information 440, for instance a particular quantile of the probability density function or histogram information, and requests 450 a subsequent chunk of the video in accordance with the target rate of transmission.

The latest observation of transmission rate at the client is preferably fed back to the statistics database to keep the latter up to date, for example according to the scheme described above (not illustrated in FIG. 4).

Preferably, the current level of network performance and one or more previous observed levels of network performance are combined to select the appropriate statistics. Indeed, particular patterns in the evolution of network performance may be indicative of particular network types, or of particular recurring events pertaining to the usage of the network.

More preferably, additional information is used to select the appropriate statistics. Examples of additional information are time of day and the day of the week. Indeed, given the fact that network performance may be severely influenced by the instantaneous number of active users, certain patterns in network usage, which may recur on a daily or weekly basis, can guide the choice of the most appropriate statistics.

Figure 5:
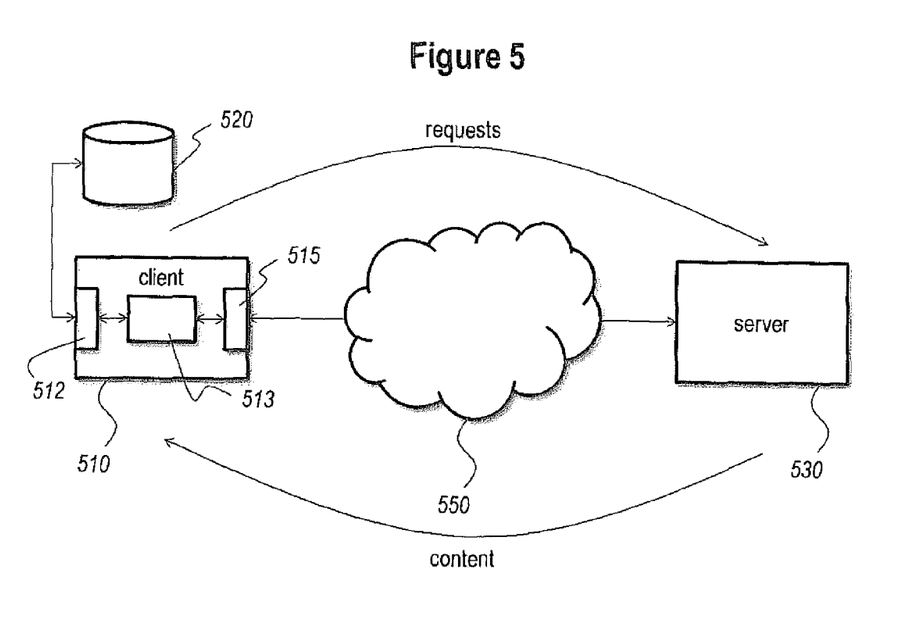
FIG. 5 provides a schematic overview of a network comprising an apparatus according to an embodiment of the present invention.

FIG. 5 provides a schematic overview of a network comprising an apparatus according to an embodiment of the present invention.

The illustrated network comprises a client 510 and a server 530, operatively connected to each other via a network 550, which may include an access network and a core network, such as the Internet. The server 530 will not be described in detail. With a view to establishing a connection with the network 550, the client 510 has a network interface 515. The term "interface" designates the necessary hardware and software required to establish data communication connectivity across the various layers of the protocol stack, as is well known to a person skilled in the art. Preferably, standardized protocols are used. An access interface may for instance include an interface for an xDSL, xPON, WMAN, or 3G link. A LAN (Local Area Network) interface may for instance include an interface for one or more of an IEEE 802.3 "Ethernet" link, an IEEE 802.11 "Wireless LAN" link. A PAN (Personal Area Network) interface may for instance include a USB interface or a Bluetooth interface.

The network connection 550 is used to relay requests (in particular, requests for individual chunks of the desired program) from the client 510 to the server 530, and to relay content (in particular, the requested chunks) from the server 530 to the client 510.

The client apparatus 510 also interfaces with a statistics database 520. To this end, the client apparatus 510 comprises a database interface 512. The database interface 512 and the statistics database 520 may be integrated in the client apparatus 510, in particular in the form of non-volatile memory such as flash memory or a magnetic disk drive.

Although the database interface 512 is illustrated in FIG. 5 as being separate from the network interface 515, it is also possible to attach the statistics database 520 directly to the network 550, in which case it could be accessed via the network interface 515. The statistics database 520 may for example be stored in a network attached storage (NAS) infrastructure or in a storage area network (SAN). In this configuration, a single networked statistics database 520 may aggregate the statistics from multiple client apparatus 510, which may lead to more accurate statistics and hence better performance of the inventive method for all the clients involved.

The client apparatus 510 further comprises a processor 513, operatively connected to the network interface 515 and the database interface 512, the processor 513 being configured to determine a current level of network performance (e.g., a rate of transmission) for transmission from the server 530 to the client apparatus 510, obtain statistical information pertaining to an expected future rate of transmission from the statistics database 520, in function of the current (and optionally the past K chunks) rate of transmission, derive a target rate of transmission from the statistical information, and request a subsequent chunk of the video from the server 530 in accordance with the target rate of transmission.

Although methods and apparatus have been described hereinabove as separate embodiments, this is done for clarity purposes only, and it should be noted that features described only in connection with method embodiments may be applied in the apparatus according to the present invention to obtain the same technical effects and advantages, and vice versa.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for receiving an Hyper Text Transport Protocol (HTTP) adaptive streaming video from a server, said method comprising at a client, operatively connected to said server:
   upon receiving a chunk of said video, determining a current rate of transmission for transmissions from said server to said client;
   obtaining statistical information pertaining to an expected future rate of transmission, in function of at least said current rate of transmission;
   deriving a target rate of transmission from said statistical information; and
   requesting a subsequent chunk of said video in accordance with said target rate of transmissions;
   the method further comprising updating said statistical information with said determined current rate of transmission, wherein said statistical information is obtained from and updated at a network node that is separate from said client, said network node being configured to store statistical information from a plurality of clients;
   wherein said statistical information comprises a histogram, and wherein said deriving comprises calculating a predetermined quantile from said histogram;
   wherein said quantile is one of a 5-percentile, a 1-percentile, and a 0.1-percentile; and
   wherein said rate of transmission information is stored at said network node in association with auxiliary information, such as an associated network type, a time of day, or a day of week.

2. The method according to claim 1, wherein said obtaining of said statistical information takes place upon starting up said client.

3. The method according to claim 1, wherein said obtaining of said statistical information takes place at intervals.

4. A non-transitory computer readable medium comprising computer program product comprising code means configured to execute by a processor the method of claim 1.

5. A set-top box comprising the apparatus according to claim 4.

6. An apparatus for receiving an Hyper Text Transport Protocol (HTTP) adaptive streaming video from a server, said apparatus comprising:
   a network interface adapted to operatively connect said apparatus to said server;
   a database interface adapted to operatively connect said apparatus to a statistics database; and
   a processor, operatively connected to said network interface and said database interface, said processor being configured to:
   determine a current rate of transmission from said server to said apparatus;
   obtain statistical information pertaining to an expected future rate of transmission, from said statistics database, in function of at least said current rate of transmission;
   derive a target rate of transmission from said statistical information; and
   request a subsequent chunk of said program from said server in accordance with said target rate of transmission;
   wherein said processor is further configured to procure said determined current rate of transmission to said statistics database;
   wherein said statistical information comprises a histogram, and wherein said deriving comprises calculating a predetermined quantile from said histogram;
   wherein said quantile is one of a 5-percentile, a 1-percentile, and a 0.1-percentile; and
   wherein said rate of transmission information is stored at said network node in association with auxiliary information, such as an associated network type, a time of day, or a day of week.

7. The apparatus according to claim 4, further comprising said statistics database, operatively connected to said database interface.

* * * * *